US008619371B2

(12) United States Patent  (10) Patent No.: US 8,619,371 B2
Fujino et al.  (45) Date of Patent:  Dec. 31, 2013

(54) PLASTIC LENS

(75) Inventors: Noboru Fujino, Saitama (JP); Takeyuki Saitoh, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 21 days.

(21) Appl. No.: 13/277,627

(22) Filed: Oct. 20, 2011

(65) Prior Publication Data

US 2012/0140336 A1    Jun. 7, 2012

(30) Foreign Application Priority Data

Dec. 2, 2010 (JP) ................................. 2010-269715

(51) Int. Cl.
*G02B 25/00*  (2006.01)
*G02B 7/02*  (2006.01)

(52) U.S. Cl.
CPC ................................ *G02B 25/001* (2013.01)
USPC ......................................... 359/642; 359/643

(58) Field of Classification Search
USPC ................................................ 359/642, 643
See application file for complete search history.

(56) References Cited

U.S. PATENT DOCUMENTS

| 4,015,897 A * | 4/1977 | Konoma et al. ................ 359/740 |
| 4,886,342 A * | 12/1989 | Kudo et al. .................... 359/738 |
| 5,982,565 A * | 11/1999 | Nomura et al. ............... 359/819 |
| 7,780,880 B2 | 8/2010 | Ito |

FOREIGN PATENT DOCUMENTS

| JP | 7-117088 A | 5/1995 |
| JP | 2003-211500 A | 7/2003 |
| JP | 2006-259561 A | 9/2006 |
| JP | 2006-272870 A | 10/2006 |

* cited by examiner

*Primary Examiner* — Scott J Sugarman
*Assistant Examiner* — Robert E Tallman
(74) *Attorney, Agent, or Firm* — Foley & Lardner LLP (57) ABSTRACT

A plastic lens includes a first surface and second surface that each have an optical function; and a peripheral surface formed at a periphery of the first surface and the second surface; and has a central portion of a thickness that is thinner than that of a peripheral portion of the plastic lens. The second surface includes an optically functional concave aspect, a recess formed along an outer perimeter of the concave aspect, a first protruding portion formed at a boundary of the concave aspect and the recess, a second protruding portion formed at a boundary of the recess and the peripheral surface, and a gate portion formed on the peripheral surface, at a position where a resin injection outlet is arranged during formation of the plastic lens.

10 Claims, 11 Drawing Sheets

PLASTIC LENS

BACKGROUND OF THE INVENTION

1. Field of the Invention

The present invention relates to a plastic lens having favorable optical characteristics and free of weld lines, which cause optical defects.

2. Description of the Related Art

In recent years, plastic lenses have become widely used in various types of imaging apparatuses consequent to the easy processing, reduced cost, and light weight of such lenses. Accordingly, many plastic lenses and manufacturing methods thereof have been proposed. Examples of such are recited in, for example, Japanese Patent Application Laid-Open Publication Nos. 2006-259561, 2006-272870, 2003-211500, and H7-117088. The plastic lenses recited in the patent documents above are manufactured by an injection molding method. This method involves fabricating a mold for forming the lens surface, injecting thermoplastic resin (hereinafter, simply "resin") from a side gate of the cavity formed by the mold, and cooling/hardening of the lens.

However, when plastic lenses are formed by the injection molding method, the direction in which the resin flows inside the cavity is difficult to control. Consequently, melted resin flows to a portion forming the outer periphery of the lens before flowing to a portion forming a central portion of the lens, whereby a weld line, which is a vestige of a junction of the resin that flowed first in the formed lens and the resin that flowed thereafter, remains. This weld line easily arises when a plastic lens is formed having a central portion of a thickness that is relatively thin compared to the thickness at the periphery.

A remnant weld line in a lens invites deterioration of optical performance. When image sensors capable of realizing high resolution did not exist, even if a weld line remained, provided the weld line was slight, image degradation was negligible and was not a significant problem. However, accompanying technological advances of image sensors, high resolution can now be realized and even if a slight weld line remains in a lens, image degradation becomes obvious immediately, arising in a significant problem.

SUMMARY OF THE INVENTION

It is an object of the present invention to at least solve the above problems in the conventional technologies.

A plastic lens according to one aspect of the present invention includes a first surface and second surface that each have an optical function; and a peripheral surface formed at a periphery of the first surface and the second surface; and has a central portion of a thickness that is thinner than that of a peripheral portion of the plastic lens. The second surface includes an optically functional concave aspect, a recess formed along an outer perimeter of the concave aspect, a first protruding portion formed at a boundary of the concave aspect and the recess, a second protruding portion formed at a boundary of the recess and the peripheral surface, and a gate portion formed on the peripheral surface, at a position where a resin injection outlet is arranged during formation of the plastic lens.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

As described, when by injection molding, a plastic lens is formed having a central portion of a thickness that is relatively thin compared to the thickness of a peripheral portion, inside the cavity, melted resin flows to a portion forming the peripheral portion before flowing to a portion forming the central portion and a weld line, which is a vestige of a junction of the resin that first flowed in the formed lens and the resin that flowed thereafter, may remain. Thus, to avoid such a problem, the lens is formed of a shape that enables control such that the resin flows at a uniform speed.

Figure 1A:
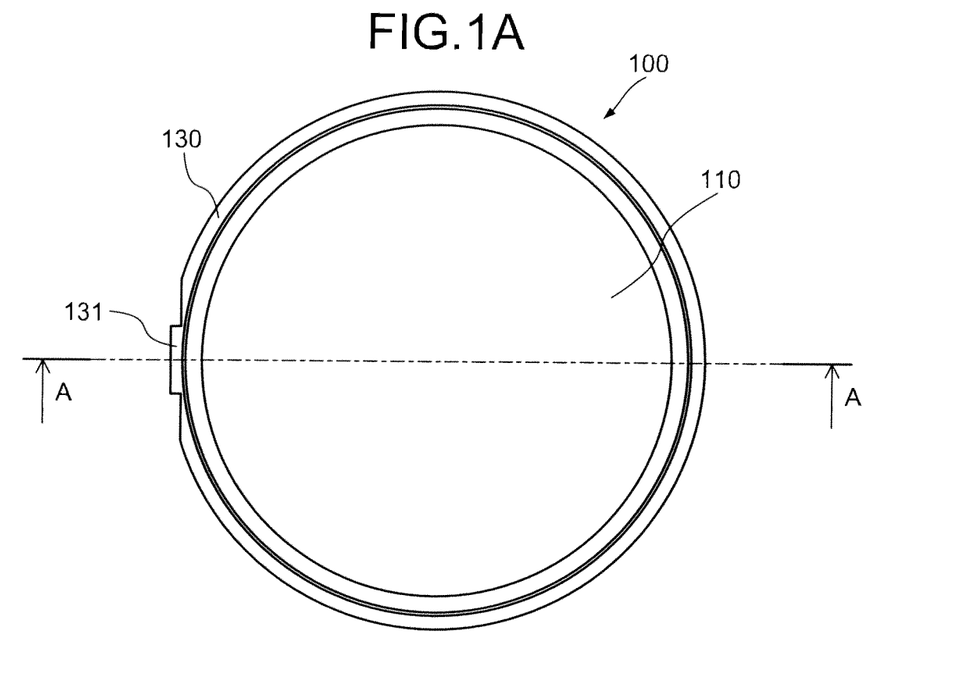
FIG. 1A is a plan view of a plastic lens according to an embodiment of the invention.
Figure 1B:
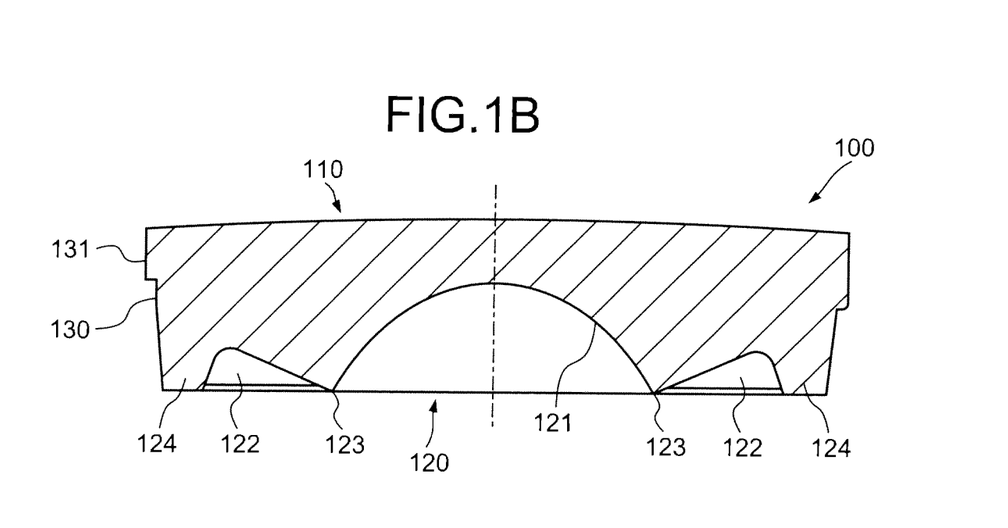
FIG. 1B is a cross sectional view along line A-A in FIG. 1A.

FIG. 1A is a plan view of a plastic lens according to an embodiment of the invention. FIG. 1B is a cross sectional view along line A-A in FIG. 1A. Line A-A is a line passing through the optical center of the plastic lens. This plastic lens 100 is formed by a first surface 110 and a second surface 120 that each have an optical function, and a peripheral surface 130 formed at the periphery of the first surface 110 and the second surface 120. The plastic lens 100 has a central portion of a thickness that is thinner than the thickness of a peripheral portion of the plastic lens 100.

The first surface 110 is formed by a convex surface or a planar surface, or concave surface that is nearly planar. The second surface 120 includes an optically functional concave aspect 121. A recess 122 is formed along the outer perimeter of the concave aspect 121. At the boundary of the concave aspect 121 and the recess 122, a first protruding portion 123 is formed. At the boundary of the recess 122 and the peripheral surface 130, a second protruding portion 124 is formed. The second protruding portion 124 has a dimension of thickness along a direction orthogonal to the optical axis. On the peripheral surface 130, at a position where the resin injection outlet is arranged during lens formation, a gate portion 131 is formed.

Figure 2:
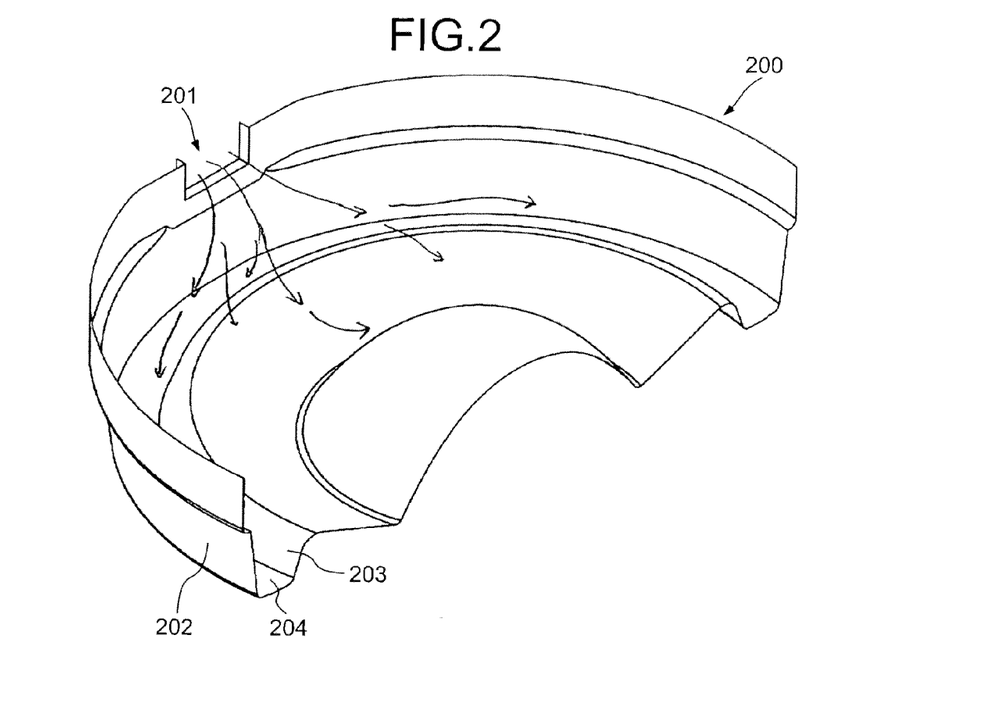
FIG. 2 is a configuration diagram of a portion of a cavity for forming the plastic lens.

FIG. 2 is a configuration diagram of a portion of the cavity for forming the plastic lens 100. As depicted in the figure, immediately after being injected into the cavity 200 from a gate 201, the resin collides with a protruding portion 203 provided near an inner peripheral portion 202 of the cavity 200 to form the recess 122 of the plastic lens 100. The protruding portion 203 further suppresses the volume of resin flowing into a groove 204 formed between the inner peripheral portion 202 and the protruding portion 203 of the cavity 200 and into which conventionally a large volume of resin tends to flow, and also increases the volume of resin flowing toward the central portion of the cavity 200.

Control can be performed such that a balance between the strength of the flow of the resin flowing along the inner peripheral portion 202 of the cavity 200 and the strength of the flow of the resin flowing toward the central portion of the cavity 200 is maintained and the speed of the resin flowing in the cavity 200 becomes uniform. As a result, the occurrence of points where flows merge in the cavity 200 are suppressed and the occurrence of weld lines, which cause optical defects, can be suppressed. Further, to effectively suppress the occurrence of weld lines, the plastic lens preferably satisfies the following conditions.

Figure 3:
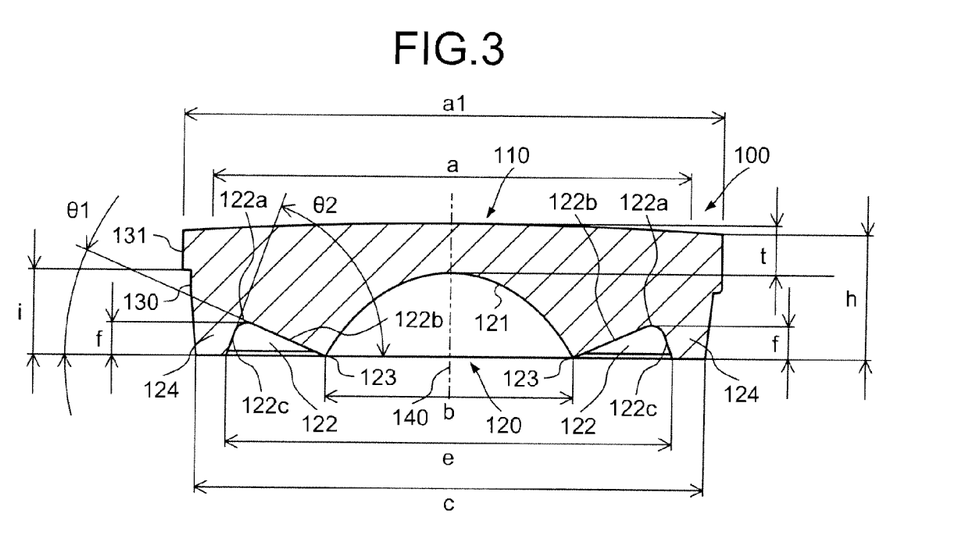
FIG. 3 is a diagram for describing configuration of the plastic lens in detail.

FIG. 3 is a diagram for describing configuration of the plastic lens 100 in detail. As depicted in FIG. 3, a first inclined aspect 122b between an apex 122a of the recess 122 and the first protruding portion 123, and a second inclined aspect 122c between the apex 122a and the second protruding portion 124 are formed. The following conditional expression is preferably satisfied, where θ1 is an angle between a plane orthogonal to an optical axis 140 of the plastic lens 100 and the first inclined aspect 122b, and θ2 is an angle between the plane orthogonal to the optical axis 140 of the plastic lens 100 and the second inclined aspect 122c.

$$\theta 1 < \theta 2 \quad (1)$$

If the first inclined aspect 122b and the second inclined aspect 122c are formed at the recess 122, in the cavity 200 depicted in FIG. 2, taking the protruding portion 203 as a reference, an inclined aspect having a relatively steep incline toward the groove 204 is formed and an inclined aspect having a relatively shallow incline toward the central portion of the cavity 200 is formed. By such a configuration, the strength of the flow of the resin flowing along the groove 204 formed between the inner peripheral portion 202 and the protruding portion 203 can be strongly controlled by the protruding portion 203. Meanwhile, resin that has overflowed the protruding portion 203 is effectively guided from the protruding portion 203 to the central portion of the cavity 200 by the inclined aspect formed to have a gradual incline toward the central portion of the cavity 200.

Therefore, a balance between the strength of the flow of the resin flowing along the inner peripheral portion 202 of the cavity 200 and the strength of the flow of resin flowing toward the central portion of the cavity 200 can be maintained where the flows are more uniform and the speed of the resin flowing inside the cavity 200 can be controlled to be uniform. If the relation between θ1 and θ2 is such that θ1≥θ2, the strength of the flow of the resin flowing along the inner peripheral portion 202 of the cavity 200 becomes relatively stronger and the balance between the strength of the flow of resin along the inner peripheral portion 202 and the strength of the flow of resin toward the central portion of the cavity 200 is lost and thus, not desirable.

Further, the position of the gate portion 131 formed on the peripheral surface 130 of the plastic lens 100 preferably satisfies the following conditional expression, where i is the height of a lower aspect of the gate portion 131 with respect to a distal end of the second protruding portion, and f is the height of the apex 122a of the recess 122 with respect to the distal end of the second protruding portion 124.

$$i - f > 0 \quad (2)$$

The position of the gate portion 131 corresponds to the position where the gate 201 is arranged, which is the resin injection outlet at the time of lens formation. If this position is too low with respect to the second surface 120, the volume of resin that overflows the protruding portion 203 and flows toward the central portion of the cavity 200 becomes too low, whereby controlling the speed of the resin flowing in the cavity 200 to be uniform becomes difficult. Thus, by conditional expression (2), a proper position for the gate portion 131 is prescribed.

The following conditional expression is preferably satisfied, where in the plastic lens 100, t is the thickness of the central portion of the plastic lens 100, and h is the thickness of the peripheral portion or the thickness from a peripheral edge of the optically functional aspect of the second surface 120 (the distal end of the first protruding portion 123) to a peripheral portion of the optically functional aspect of the first surface 110.

$$1:3.5 \leq t:h \leq 1:2 \quad (3)$$

The following conditional expression is preferably satisfied, where f is the height of the apex 122a of the recess 122 with respect to the distal end of the second protruding portion 124, and h is the thickness of the peripheral portion or the thickness from the peripheral edge of the optically functional aspect of the second surface 120 (the distal end of the first protruding portion 123) to the peripheral portion of the optically functional aspect of the first surface 110.

$$0.2 \leq f/h \leq 0.6 \quad (4)$$

By satisfying conditional expression (3), when the plastic lens 100 is formed, the balance between the strength of the flow of the resin flowing along the inner peripheral portion 202 of the cavity 200 and the strength of the flow of the resin flowing toward the central portion of the cavity 200 can be maintained where the flows are more uniform and the speed of the resin flowing inside the cavity 200 can be controlled to be uniform. In addition, by satisfying conditional expression (4), these effects can be expected further.

The following conditional expressions are preferably satisfied, where in the plastic lens 100, a1 is the outer diameter of the plastic lens 100, a is the diameter of the effective optical aspect of the first surface 110, and b is the diameter of the effective optical aspect of the second surface 120.

$$0.4 \leq b/a \leq 0.65 \quad (5)$$

$$0.4 \leq b/a1 \leq 0.65 \quad (6)$$

By satisfying conditional expressions (5) and (6), when the plastic lens 100 is formed, the balance between the strength of the resin flowing along the inner peripheral portion 202 of the cavity 200 and the strength of the flow of the resin flowing toward the central portion of the cavity 200 can be further maintained where the flows are in a substantially uniform state, and the speed of the resin flowing in the cavity 200 can be controlled to be uniform.

The following conditional expression is preferably satisfied, where in the plastic lens 100, c is the outer diameter of the second protruding portion 124.

$$0.75 \leq c/a1 \leq 1 \quad (7)$$

By satisfying conditional expression (7), when the plastic lens 100 is formed, the balance between the strength of the resin flowing along the inner peripheral portion 202 of the cavity 200 and the strength of the flow of the resin flowing toward the central portion of the cavity 200 can be further maintained where the flows are in a substantially uniform state, and the speed of the resin flowing in the cavity 200 can be controlled to be uniform.

The following conditional expression is preferably satisfied, where in the plastic lens 100, e is the inner diameter of the second protruding portion 124.

$$0.75 \leq e/c \leq 0.9 \quad (8)$$

By satisfying conditional expression (8), when the plastic lens 100 is formed, the balance between the strength of the resin flowing along the inner peripheral portion 202 of the cavity 200 and the strength of the flow of the resin flowing toward the central portion of the cavity 200 can be further maintained where the flows are in a substantially uniform state, and the speed of the resin flowing in the cavity 200 can be controlled to be uniform.

The following conditional expression is preferably satisfied, where in the plastic lens 100, a direction from the first surface 110 toward the second surface 120 is positive, and g is the height of the distal end of the second protruding portion 124 with respect to the position of the distal end of the first protruding portion 123.

$$-0.3 \leq g/h \leq 0.5 \quad (9)$$

Figure 4:
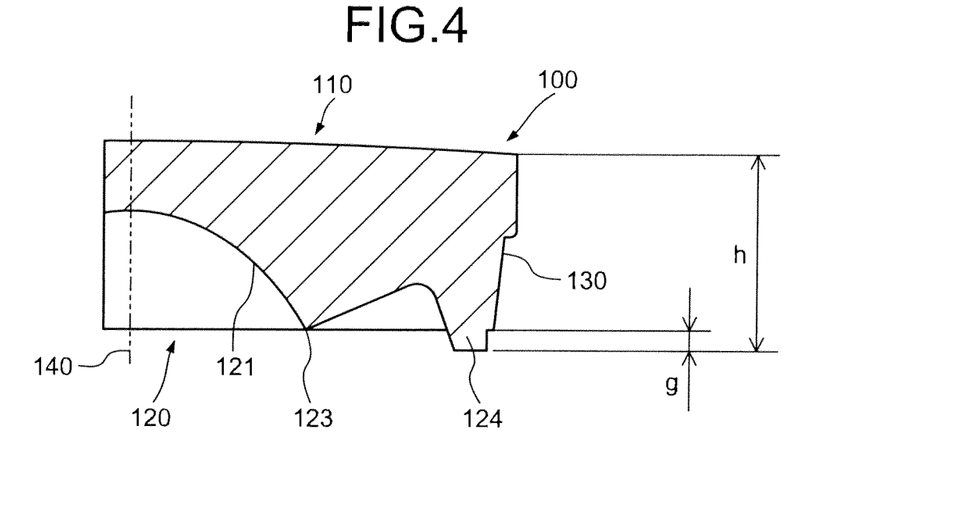
FIG. 4 is a partial cross sectional view of the plastic lens.

FIG. 4 is a partial cross sectional view of the plastic lens 100. FIG. 4 depicts the relation between the thickness of the peripheral portion of the plastic lens 100 or the thickness from a peripheral edge of the optically functional aspect of the second surface 120 (the distal end the first protruding portion 123) to the peripheral portion of the optically functional aspect of the first surface 110 (h), and the height of the distal portion of the second protruding portion 124 with respect to the distal portion of the first protruding portion 123 (g). As depicted in FIG. 4, if the cavity 200 is configured where the height of the distal portion of the second protruding portion 124 with respect to the distal portion of the first protruding portion 123 (g) is too large (in FIG. 4, the distal portion of the second protruding portion 124 is positioned significantly lower that the position of the distal portion of the first protruding portion 123) (g/h>0.5) and the volume of resin flowing toward the central portion of the cavity 200 becomes too low, whereby the balance between the strength of the flow of the resin flowing along the inner peripheral portion 202 of the cavity 200 and the strength of the flow of the resin flowing toward the central portion of the cavity 200, is lost.

On the other hand, if the cavity 200 is configured such that the height of the distal portion of the second protruding portion 124 with respect to the distal portion of the first protruding portion 123 (g) becomes to small (in FIG. 4, the apex of the second protruding portion 124 is significantly higher than the position of the apex of the first protruding portion 123) (g/h<−0.3), the volume of resin flowing toward the central portion of the cavity 200 becomes too high and the balance between the strength of the flow of the resin flowing along the inner peripheral portion 202 of the cavity 200 and the strength of the flow of the resin flowing toward the central portion of the cavity 200 is lost and thus, not desirable.

By satisfying conditional expression (9), when the plastic lens 100 is formed, the balance of the strength of the flow of the resin flowing along the inner peripheral portion 202 of the cavity 200 and the strength of the flow of the resin flowing toward the central portion of the cavity 200 can be maintained where the flows are more uniform. As a result, the speed of the resin flowing in the cavity 200 can be control to be uniform, enabling the occurrence of weld lines to be prevented.

Figure 5:
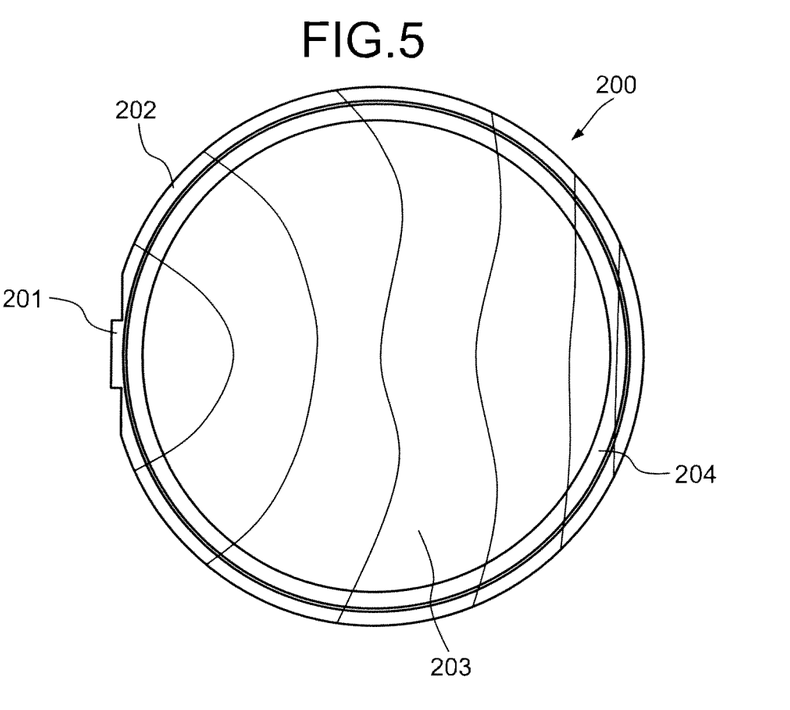
FIG. 5 is a schematic of resin flow in the cavity forming the plastic lens.

FIG. 5 is a schematic of resin flow in the cavity 200 forming the plastic lens 100. In the figure, curved lines in the cavity 200 indicate the position of the head of the resin flow after the elapse of a given period. By forming the plastic lens 100 to satisfy the conditional expressions above, the balance between the strength of the flow of the resin flowing along the inner peripheral portion 202 of the cavity 200 and the strength of the flow of the resin flowing toward the central portion of the cavity 200 can be further maintained where the flows are in a substantially uniform state and the speed of the resin flowing in the cavity 200 can be controlled to be uniform.

As a result, the occurrence of points where flows merge in the cavity 200 are suppressed and the occurrence of weld lines, which cause optical defects, can be prevented. When the plastic lens 100 is mounted to an imaging apparatus, the first surface 110 may be positioned to face toward the object side, nonetheless, even if the first surface 110 is positioned to face toward the image side, there is no difference.

Hereinafter, with reference to the accompanying drawings, examples of the plastic lens according to the invention will be described. Components identical to the components above will be assigned the same reference numerals used above. The invention is not limited by the following examples.

Figure 6A:
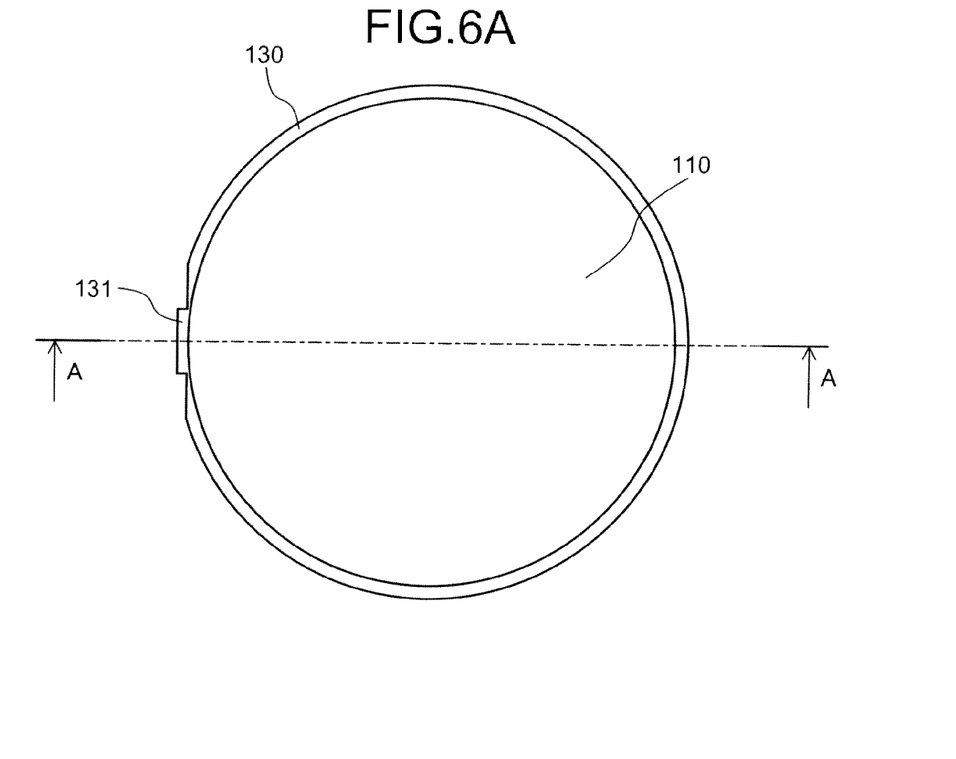
FIG. 6A is a plan view of the plastic lens according to a first example.
Figure 6B:
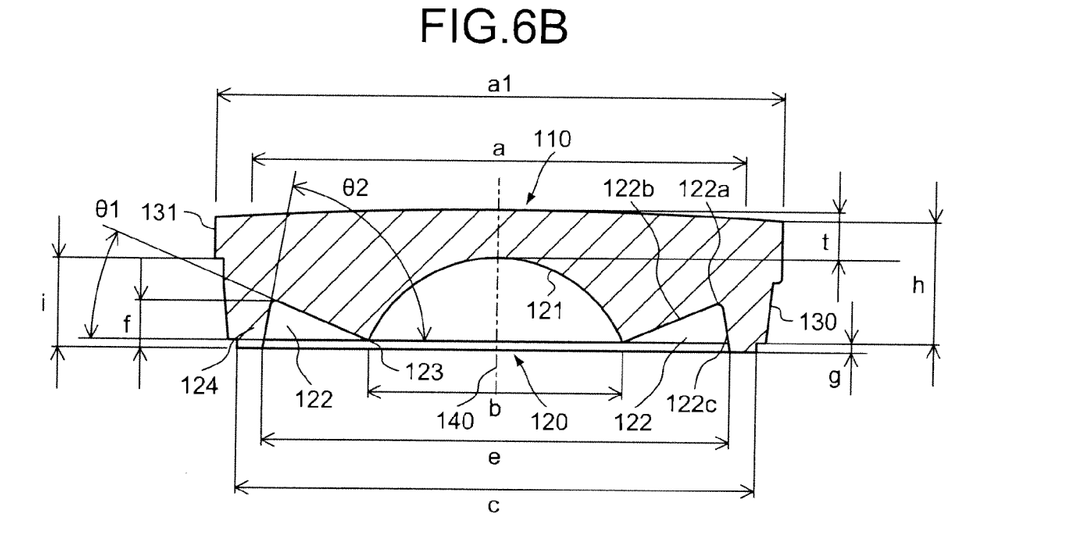
FIG. 6B is a cross sectional view along line A-A in FIG. 6A.

FIG. 6A is a plan view of the plastic lens according to a first example. FIG. 6B is a cross sectional view along line A-A in FIG. 6A. Line A-A is a line passing through the optical center of the plastic lens.

(Values Related to Conditional Expression (1))
Angle between plane orthogonal to optical axis 140 and first inclined aspect 122b ($\theta1$)=23°
Angle between plane orthogonal to optical axis 140 and second inclined aspect 122c ($\theta2$)=80°

$$(\therefore \theta1 \leq \theta2)$$

(Values Related to Conditional Expression (2))
Height of lower aspect of gate portion 131 with respect to distal end of second protruding portion 124 (i)=1.85 (mm)
Height of apex 122a of recess 122 with respect to distal end of second protruding portion 124 (f)=1.21 (mm)

$$i-f=0.64 (>0)$$

(Values Related to Conditional Expression (3))
Thickness of central portion of lens (t)=1.2 (mm)
Thickness of peripheral portion of lens, or thickness from peripheral edge of optically functional aspect of second surface 120 (distal end of first protruding portion 123) to peripheral portion of optically functional aspect of first surface 110 (h)=3.2 (mm)

$$t:h=1:2.67$$

$$(\therefore 1:3.5 \leq t:h \leq 1:2)$$

(Values Related to Conditional Expression (4))

$f/h = 0.38$ $(\therefore 0.2 \le f/h \le 0.6)$ (Values Related to Conditional Expressions (5), (6))
Outer diameter of plastic lens 100 (a1)=13.8 (mm)
Diameter of effective optical aspect of first surface 110 (a)=12.4 (mm)
Diameter of effective optical aspect of second surface 120 (b)=6.2 (mm)

$b/a = 0.5$ $b/a1 = 0.45$ $(\therefore 0.4 \le b/a \le 0.65)$ $(\therefore 0.4 \le b/a1 \le 0.65)$ (Values Related to Conditional Expression (7))
Outer diameter of second protruding portion 124 (c)=12.6 (mm)

$c/a1 = 0.91$ $(\therefore 0.75 \le c/a1 \le 1)$ (Values Related to Conditional Expression (8))
Inner diameter of second protruding portion 124 (e)=11.3 (mm)

$e/c = 0.897$ $(\therefore 0.75 \le e/c \le 0.9)$ (Values Related to Conditional Expression (9))
Height of distal end of second protruding portion 124 with respect to position of distal end of first protruding portion 123 (g)=0.2 (mm) (direction from first surface 110 toward second surface 120 is positive)

$g/h = 0.063$ $(\therefore -0.3 \le g/h \le 0.5)$

Figure 7A:
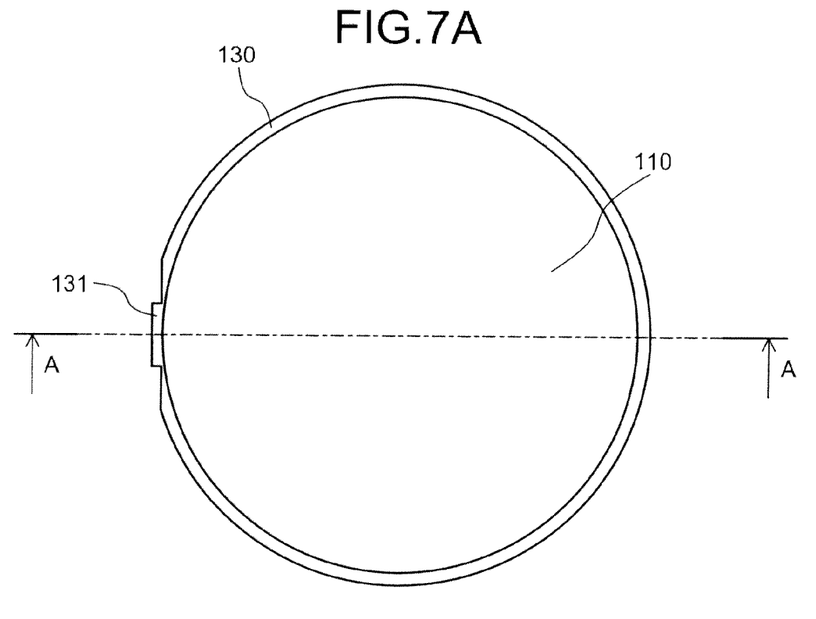
FIG. 7A is a plan view of the plastic lens according to a second example.
Figure 7B:
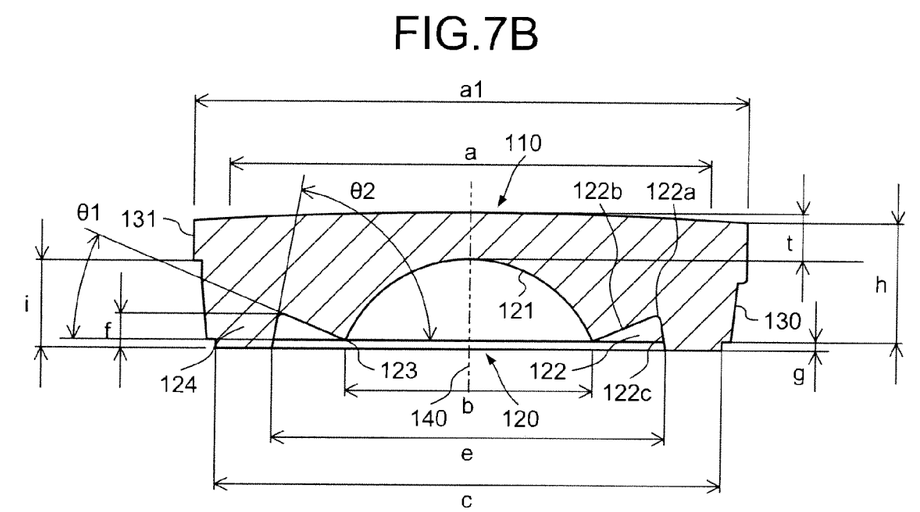
FIG. 7B is a cross sectional view along line A-A in FIG. 7A.

FIG. 7A is a plan view of the plastic lens according to a second example. FIG. 7B is a cross sectional view along line A-A in FIG. 7A. Line A-A is a line passing through the optical center of the plastic lens.

(Values Related to Conditional Expression (1))
Angle between plane orthogonal to optical axis 140 and first inclined aspect 122b (θ1)=23°
Angle between plane orthogonal to optical axis 140 and second inclined aspect 122c (θ2)=80°

$(\therefore \theta 1 < \theta 2)$ (Values Related to Conditional Expression (2))
Height of lower aspect of gate portion 131 with respect to distal end of second protruding portion 124 (i)=1.85 (mm)
Height of apex 122a of recess 122 with respect to distal end of second protruding portion 124 (f)=0.7 (mm)

$i - f = 1.15 (>0)$ (Values Related to Conditional Expression (3))
Thickness of central portion of lens (t)=1.2 (mm)
Thickness of peripheral portion of lens, or thickness from peripheral edge of optically functional aspect of second surface 120 (distal end of first protruding portion 123) to peripheral portion of optically functional aspect of first surface 110 (h)=3.0 (mm)

$t/h = 0.4$ $(\therefore 1:3.5 \le t:h \le 1:2)$ (Values Related to Conditional Expression (4))

$f/h = 0.233$ $(\therefore 0.2 \le f/h \le 0.6)$ (Values Related to Conditional Expressions (5), (6))
Outer diameter of plastic lens 100 (a1)=13.8 (mm)
Diameter of effective optical aspect of first surface 110 (a)=12.4 (mm)
Diameter of effective optical aspect of second surface 120 (b)=6.2 (mm)

$b/a = 0.5$ $b/a1 = 0.45$ $(\therefore 0.4 \le b/a \le 0.65)$ $(\therefore 0.4 \le b/a1 \le 0.65)$ (Values Related to Conditional Expression (7))
Outer diameter of second protruding portion 124 (c)=12.6 (mm)

$c/a1 = 0.91$ $(\therefore 0.75 \le c/a1 \le 1)$ (Values Related to Conditional Expression (8))
Inner diameter of second protruding portion 124 (e)=9.76 (mm)

$e/c = 0.75$ $(\therefore 0.75 \le e/c \le 0.9)$ (Values Related to Conditional Expression (9))
Height of distal end of second protruding portion 124 with respect to position of distal end of first protruding portion 123 (g)=0.2 (mm) (direction from first surface 110 toward second surface 120 is positive)

$g/h = 0.067$ $(\therefore -0.3 \le g/h \le 0.5)$

Figure 8A:
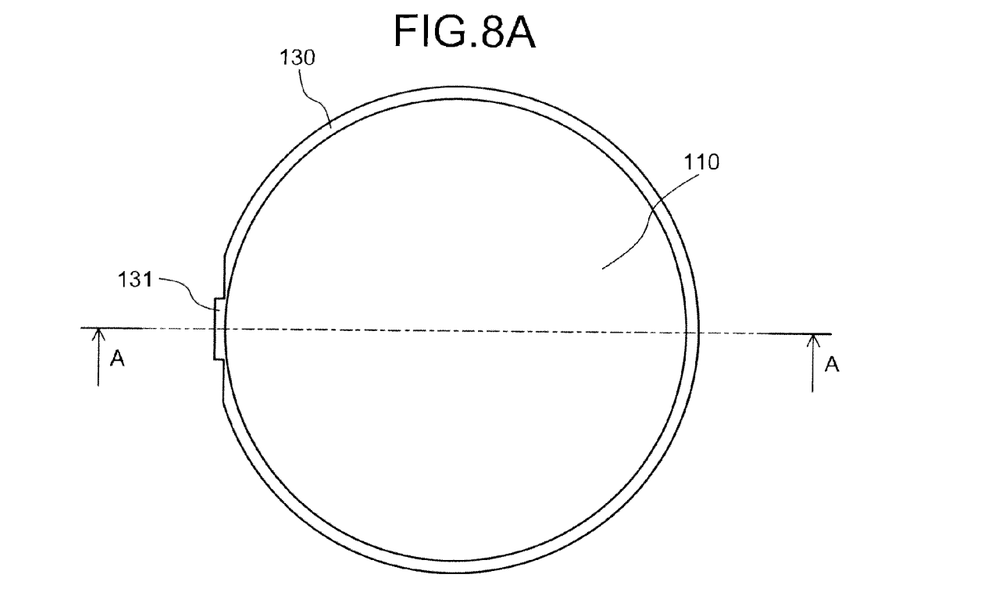
FIG. 8A is a plan view of the plastic lens according to a third example.
Figure 8B:
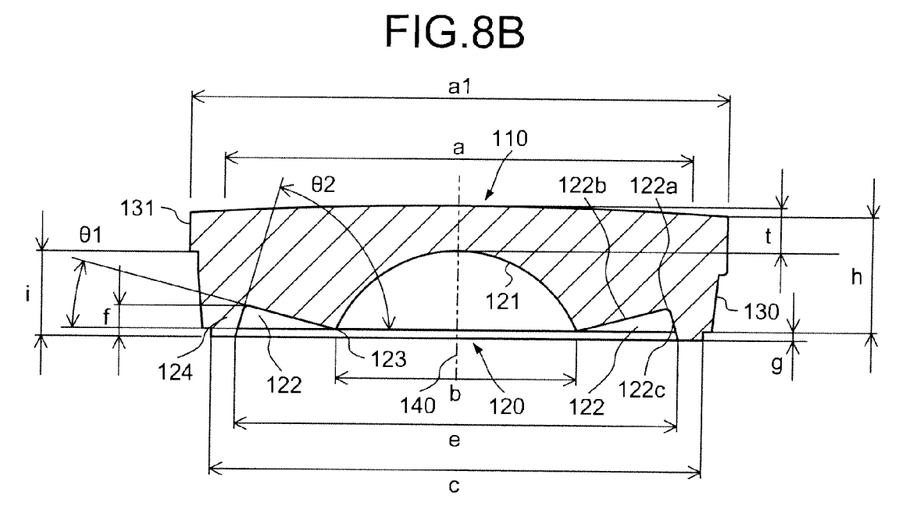
FIG. 8B is a cross sectional view along line A-A in FIG. 8A.

FIG. 8A is a plan view of the plastic lens according to a third example. FIG. 8B is a cross sectional view along line A-A in FIG. 8A. Line A-A is a line passing through the optical center of the plastic lens.

(Values Related to Conditional Expression (1))
Angle between plane orthogonal to optical axis 140 and first inclined aspect 122b (θ1)=14.2°
Angle between plane orthogonal to optical axis 140 and second inclined aspect 122c (θ2)=73.5°

$(\therefore \theta 1 < \theta 2)$ (Values Related to Conditional Expression (2))
Height of lower aspect of gate portion 131 with respect to distal end of second protruding portion 124 (i)=1.85 (mm)
Height of apex 122a of recess 122 with respect to distal end of second protruding portion 124 (f)=0.6 (mm)

$i - f = 1.25 (>0)$ (Values Related to Conditional Expression (3))
Thickness of central portion of lens (t)=1.2 (mm)
Thickness of peripheral portion of lens, or thickness from peripheral edge of optically functional aspect of second surface 120 (distal end of first protruding portion 123) to peripheral portion of optically functional aspect of first surface 110 (h)=3(mm)

$t/h = 0.4$ $(\therefore 1:3.5 \le t:h \le 1:2)$ (Values Related to Conditional Expression (4))

$f/h=0.2$ $(\therefore 0.2 \le f/h \le 0.6)$ (Values Related to Conditional Expressions (5), (6))
Outer diameter of plastic lens 100 (a1)=13.8 (mm)
Diameter of effective optical aspect of first surface 110 (a)=12.4 (mm)
Diameter of effective optical aspect of second surface 120 (b)=6.2 (mm)

$b/a=0.5$ $b/a1=0.45$ $(\therefore 0.4 \le b/a \le 0.65)$ $(\therefore 0.4 \le b/a1 \le 0.65)$ (Values Related to Conditional Expression (7))
Outer diameter of second protruding portion 124 (c)=12.6 (mm)

$c/a1=0.91$ $(\therefore 0.75 \le c/a1 \le 1)$ (Values Related to Conditional Expression (8))
Inner diameter of second protruding portion 124 (e)=11.3 (mm)

$e/c=0.897$ $(\therefore 0.75 \le e/c \le 0.9)$ (Values Related to Conditional Expression (9))
Height of distal end of second protruding portion 124 with respect to position of distal end of first protruding portion 123 (g)=0.2 (mm) (direction from first surface 110 toward second surface 120 is positive)

$g/h=0.067$ $(\therefore -0.3 \le g/h \le 0.5)$

Figure 9A:
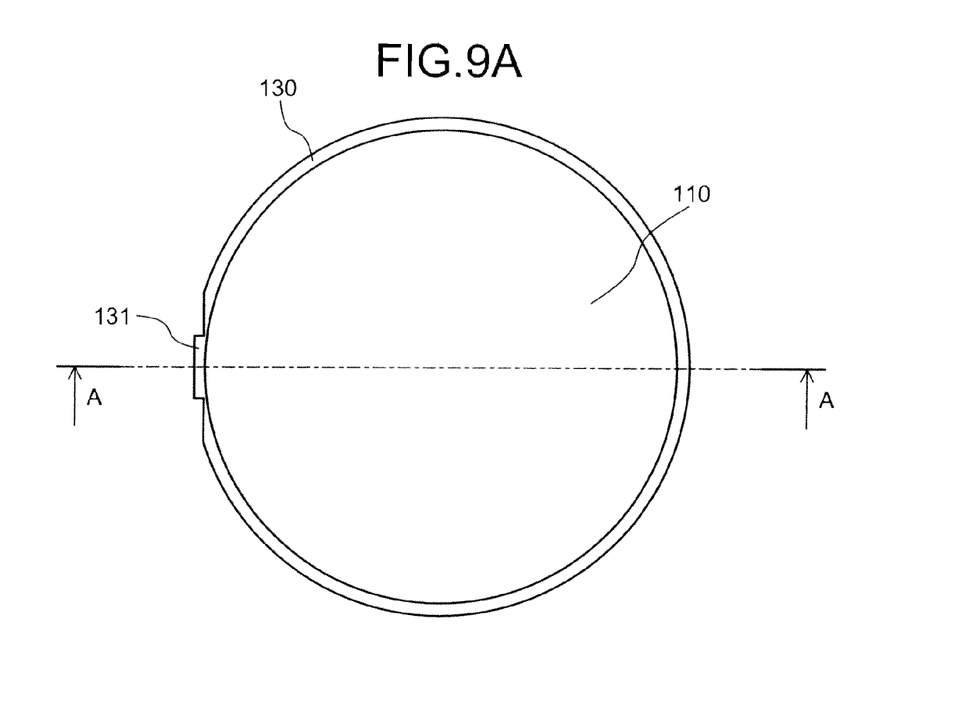
FIG. 9A is a plan view of the plastic lens according to a fourth example.
Figure 9B:
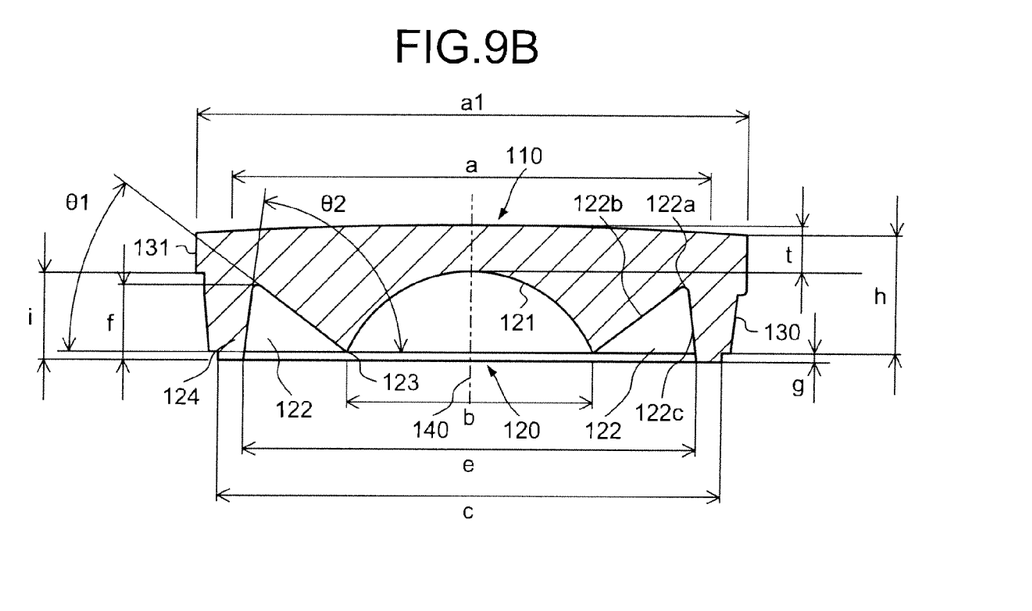
FIG. 9B is a cross sectional view along line A-A in FIG. 9A.

FIG. 9A is a plan view of the plastic lens according to a fourth example. FIG. 9B is a cross sectional view along line A-A in FIG. 9A. Line A-A is a line passing through the optical center of the plastic lens.

(Values Related to Conditional Expression (1))
Angle between plane orthogonal to optical axis 140 and first inclined aspect 122*b* (θ1)=37.2°
Angle between plane orthogonal to optical axis 140 and second inclined aspect 122*c* (θ2)=84.4°

$(\therefore \theta1 < \theta2)$ (Values Related to Conditional Expression (2))
Height of lower aspect of gate portion 131 with respect to distal end of second protruding portion 124 (i)=1.85 (mm)
Height of apex 122*a* of recess 122 with respect to distal end of second protruding portion 124 (f)=1.8 (mm)

$i-f=0.05(>0)$ (Values Related to Conditional Expression (3))
Thickness of central portion of lens (t)=1.2 (mm)
Thickness of peripheral portion of lens, or thickness from peripheral edge of optically functional aspect of second surface 120 (distal end of first protruding portion 123) to peripheral portion of optically functional aspect of first surface 110 (h)=3 (mm)

$t/h=0.4$ $(\therefore 1:3.5 \le t/h \le 1:2)$ (Values Related to Conditional Expression (4))

$f/h=0.6$ $(\therefore 0.2 \le f/h \le 0.6)$ (Values Related to Conditional Expressions (5), (6))
Outer diameter of plastic lens 100 (a1)=13.8 (mm)
Diameter of effective optical aspect of first surface 110 (a)=12.4 (mm)
Diameter of effective optical aspect of second surface 120 (b)=6.2 (mm)

$b/a=0.5$ $b/a1=0.45$ $(\therefore 0.4 \le b/a \le 0.65)$ $(\therefore 0.4 \le b/a1 \le 0.65)$ (Values Related to Conditional Expression (7))
Outer diameter of second protruding portion 124 (c)=12.6 (mm)

$c/a1=0.913$ $(\therefore 0.75 \le c/a1 \le 1)$ (Values Related to Conditional Expression (8))
Inner diameter of second protruding portion 124 (e)=11.3 (mm)

$e/c=0.897$ $(\therefore 0.75 \le e/c \le 0.9)$ (Values Related to Conditional Expression (9))
Height of distal end of second protruding portion 124 with respect to position of distal end of first protruding portion 123 (g)=0.2 (mm) (direction from first surface 110 toward second surface 120 is positive)

$g/h=0.067$ $(\therefore -0.3 \le g/h \le 0.5)$

Figure 10A:
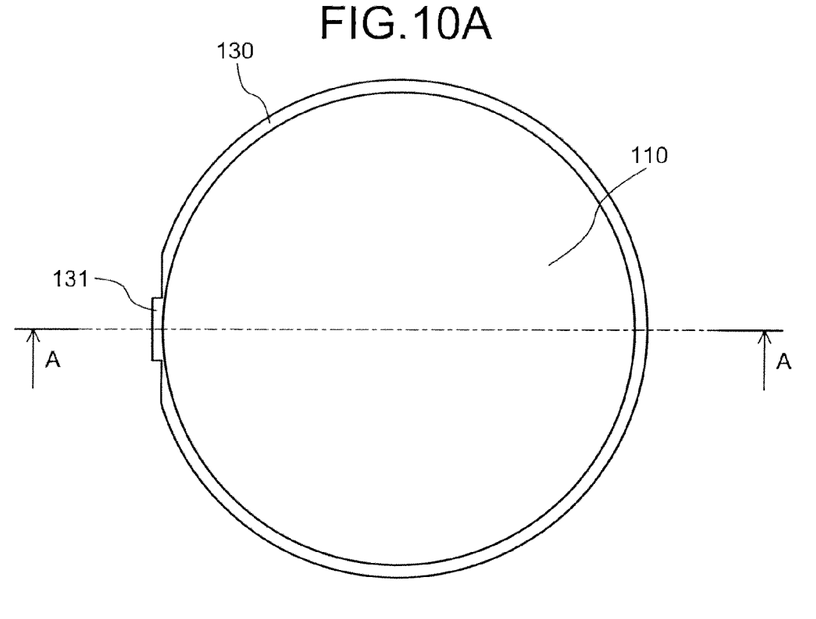
FIG. 10A is a plan view of the plastic lens according to a fifth example.
Figure 10B:
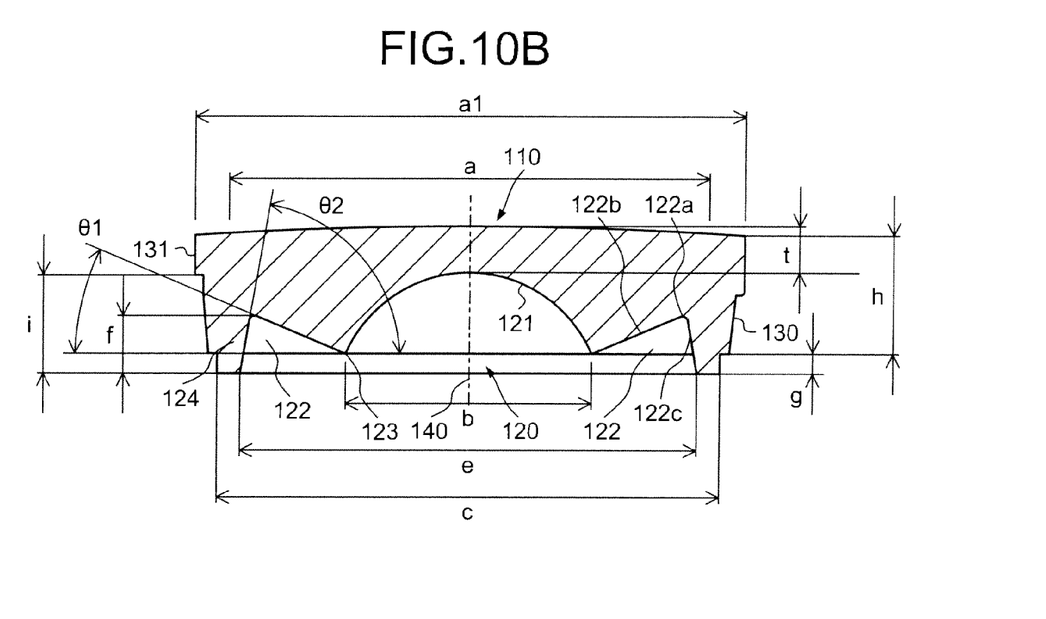
FIG. 10B is a cross sectional view along line A-A in FIG. 10A.

FIG. 10A is a plan view of the plastic lens according to a fifth example. FIG. 10B is a cross sectional view along line A-A in FIG. 10A. Line A-A is a line passing through the optical center of the plastic lens.

(Values Related to Conditional Expression (1))
Angle between plane orthogonal to optical axis 140 and first inclined aspect 122*b* (θ1)=23°
Angle between plane orthogonal to optical axis 140 and second inclined aspect 122*c* (θ2)=80°

$(\therefore \theta1 < \theta2)$ (Values Related to Conditional Expression (2))
Height of lower aspect of gate portion 131 with respect to distal end of second protruding portion 124 (i)=1.95 (mm)
Height of apex 122*a* of recess 122 with respect to distal end of second protruding portion 124 (f)=1.51 (mm)

$i-f=0.44(>0)$ (Values Related to Conditional Expression (3))
Thickness of central portion of lens (t)=1.2 (mm)
Thickness of peripheral portion of lens, or thickness from peripheral edge of optically functional aspect of second surface 120 (distal end of first protruding portion 123) to peripheral portion of optically functional aspect of first surface 110 (h)=3 (mm)

$t/h=0.4$ $(\therefore 1:3.5 \le t/h \le 1:2)$ (Values Related to Conditional Expression (4))

$f/h=0.5$ $(\therefore 0.2 \leq f/h \leq 0.6)$ (Values Related to Conditional Expressions (5), (6))
Outer diameter of plastic lens 100 (a1)=13.8 (mm)
Diameter of effective optical aspect of first surface 110 (a)=12.4 (mm)
Diameter of effective optical aspect of second surface 120 (b)=6.2 (mm)

$b/a=0.5$ $b/a1=0.45$ $(\therefore 0.4 \leq b/a \leq 0.65)$ $(\therefore 0.4 \leq b/a1 \leq 0.65)$ (Values Related to Conditional Expression (7))
Outer diameter of second protruding portion 124 (c)=12.6 (mm)

$c/a1=0.913$ $(\therefore 0.75 \leq c/a1 \leq 1)$ (Values Related to Conditional Expression (8))
Inner diameter of second protruding portion 124 (e)=11.5 (mm)

$e/c=0.913$ $(\therefore 0.75 \leq e/c \leq 0.9)$ (Values Related to Conditional Expression (9))
Height of distal end of second protruding portion 124 with respect to position of distal end of first protruding portion 123 (g)=1.5 (mm) (direction from first surface 110 toward second surface 120 is positive)

$g/h=0.5$ $(\therefore -0.3 \leq g/h \leq 0.5)$

Figure 11A:
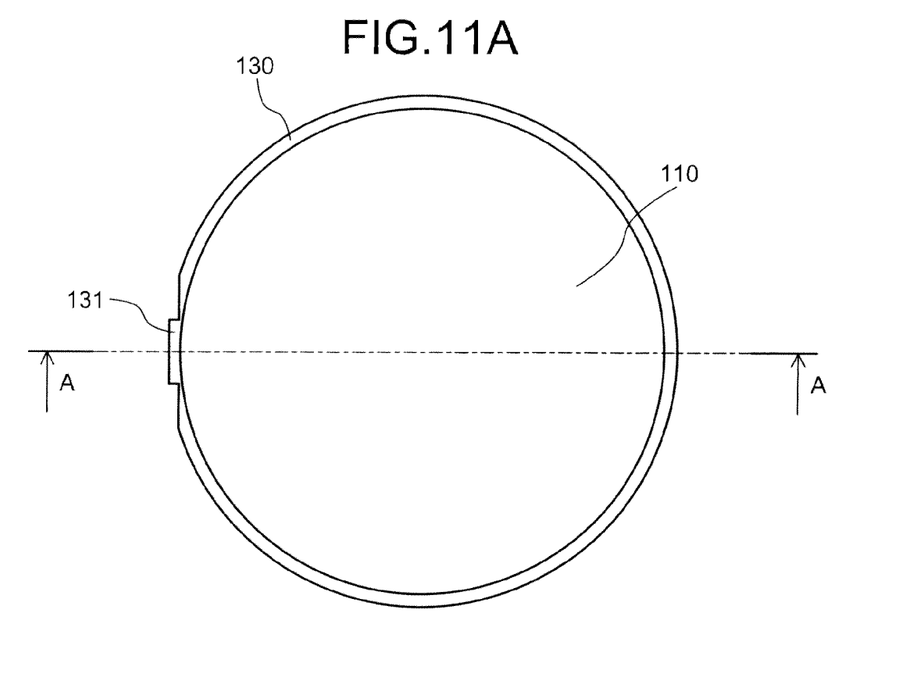
FIG. 11A is a plan view of the plastic lens according to a sixth example.
Figure 11B:
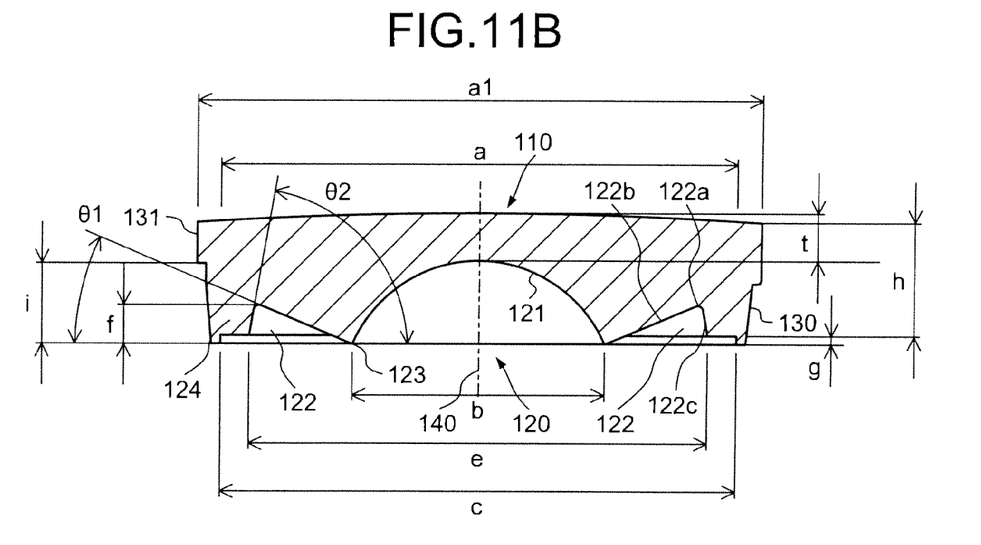
FIG. 11B is a cross sectional view along line A-A in FIG. 11A.

FIG. 11A is a plan view of the plastic lens according to a sixth example. FIG. 11B is a cross sectional view along line A-A in FIG. 11A. Line A-A is a line passing through the optical center of the plastic lens.
(Values Related to Conditional Expression (1))
Angle between plane orthogonal to optical axis 140 and first inclined aspect 122b (θ1)=23°
Angle between plane orthogonal to optical axis 140 and second inclined aspect 122c (θ2)=80°

$(\therefore \theta 1 < \theta 2)$ (Values Related to Conditional Expression (2))
Height of lower aspect of gate portion 131 with respect to distal end of second protruding portion 124 (i)=1.65 (mm)
Height of apex 122a of recess 122 with respect to distal end of second protruding portion 124 (f)=1.0 (mm)

$i-f=0.65 (>0)$ (Values Related to Conditional Expression (3))
Thickness of central portion of lens (t)=1.2 (mm)
Thickness of peripheral portion of lens, or thickness from peripheral edge of optically functional aspect of second surface 120 (distal end of first protruding portion 123) to peripheral portion of optically functional aspect of first surface 110 (h)=3 (mm)

$t/h=0.33$ $(\therefore 1:3.5 \leq t:h \leq 1:2)$ (Values Related to Conditional Expression (4))

$f/h=0.15$ $(\therefore 0.2 \leq f/h \leq 0.6)$ (Values Related to Conditional Expressions (5), (6))
Outer diameter of plastic lens 100 (a1)=13.8 (mm)
Diameter of effective optical aspect of first surface 110 (a)=12.4 (mm)
Diameter of effective optical aspect of second surface 120 (b)=6.2 (mm)

$b/a=0.5$ $b/a1=0.45$ $(\therefore 0.4 \leq b/a \leq 0.65)$ $(\therefore 0.4 \leq b/a1 \leq 0.65)$ (Values Related to Conditional Expression (7))
Outer diameter of second protruding portion 124 (c)=12.6 (mm)

$c/a1=0.913$ $(\therefore 0.75 \leq c/a1 \leq 1)$ (Values Related to Conditional Expression (8))
Inner diameter of second protruding portion 124 (e)=11.3 (mm)

$e/c=0.897$ $(\therefore 0.75 \leq e/c \leq 0.9)$ (Values Related to Conditional Expression (9))
Height of distal end of second protruding portion 124 with respect to position of distal end of first protruding portion 123 (g)=−0.6 (mm) (direction from first surface 110 toward second surface 120 is positive)

$g/h=-0.2$ $(\therefore -0.3 \leq g/h = 0.5)$

Figure 12A:
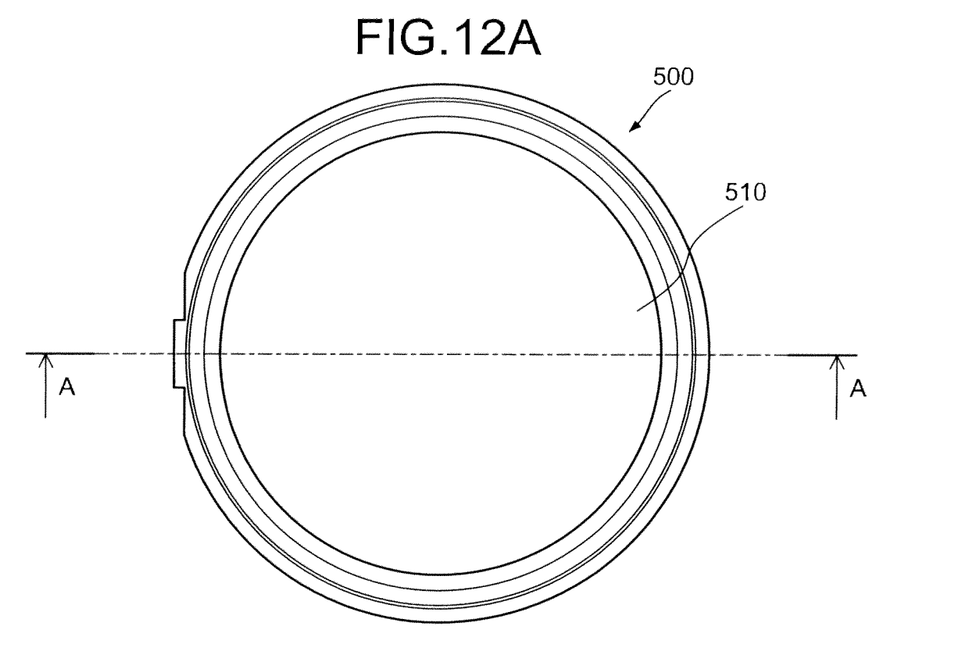
FIG. 12A is a plan view of a conventional plastic lens.
Figure 12B:
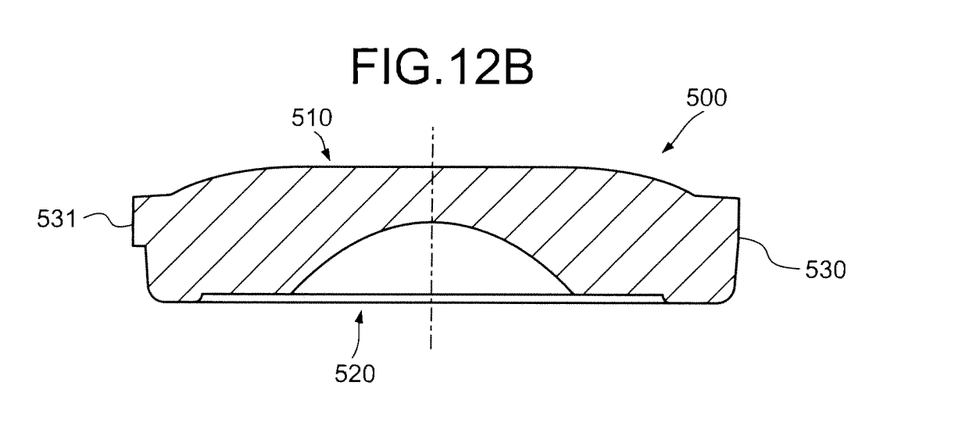
FIG. 12B is a cross sectional view along line A-A in FIG. 12A.

As reference example, FIG. 12A is a plan view of a conventional plastic lens. FIG. 12B is a cross sectional view along line A-A in FIG. 12A.

In the reference example as well, similar to the plastic lens 100, a conventional plastic lens 500 is considered that is formed by a first surface 510 and a second surface 520 that each have an optical function, and peripheral surface 530 formed by the first surface 510 and the second surface 520. The thickness of the central portion is thinner than the thickness of the peripheral portion. On the peripheral surface 530, at a position wherein the resin injection outlet is arranged during lens formation, a gate portion 531 is formed. Here, the most distinguishing characteristic is the lack of (at the second surface 520 of the conventional plastic lens 500) the recess 122 that the plastic lens 100 according to the invention has.

Figure 13:
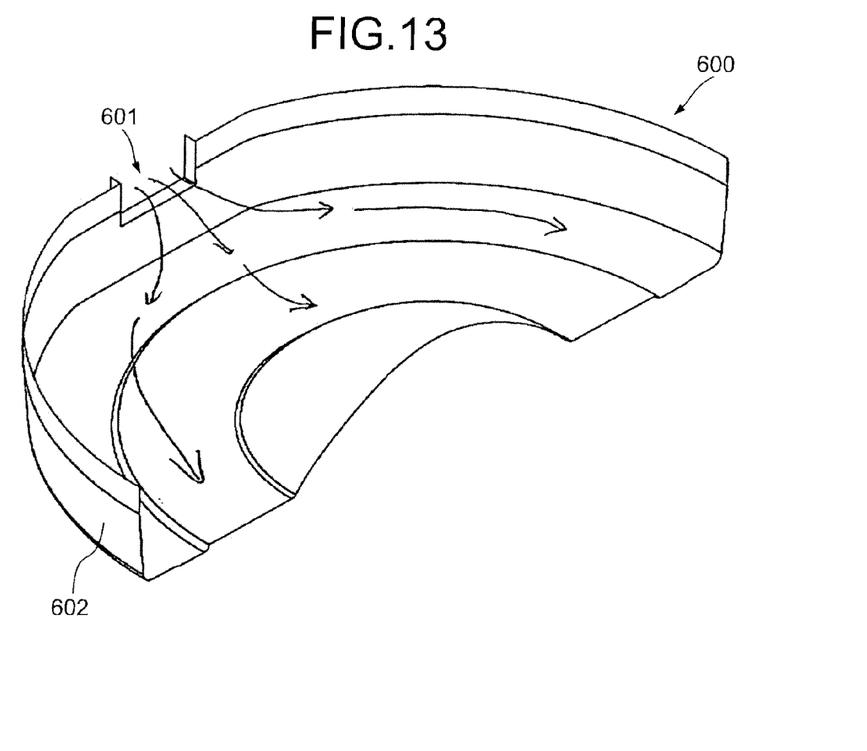
FIG. 13 is a configuration diagram of a portion of the conventional plastic lens.

FIG. 13 is a configuration diagram of a portion of the conventional plastic lens 500. As depicted in the figure, since the strength of the flow of the resin injected from a gate 601 into a cavity 600 is strong along an outer perimeter wall surface 602 and the flow to the central portion of the cavity 600 is slower than the flow to the outer perimeter wall surface 602, in the cavity 600, areas where the resin flows merge arise.

Figure 14:
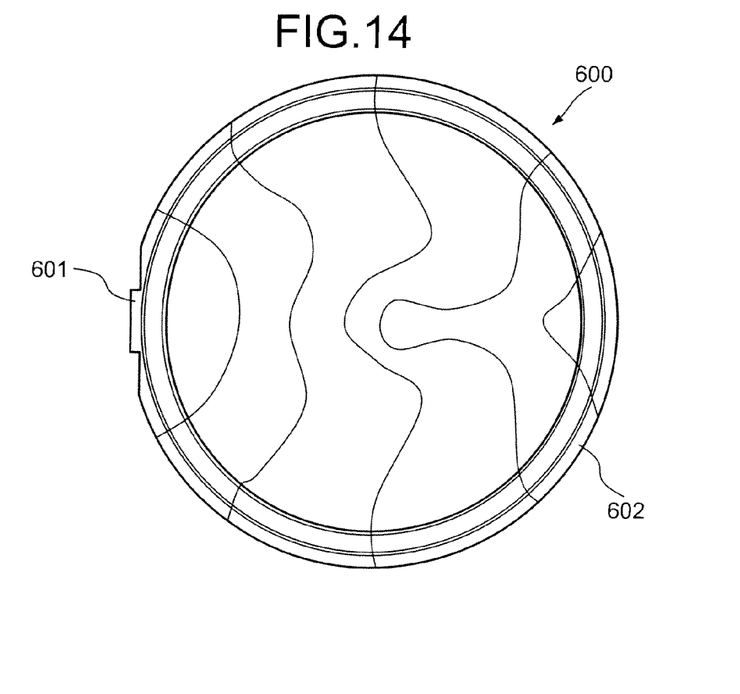
FIG. 14 is a schematic of resin flow in the cavity 600 of the conventional plastic lens.

FIG. 14 is a schematic of resin flow in the cavity 600 of the conventional plastic lens 500. In the figure, curved lines in the cavity 600 indicate the position of the head of the resin flow after the elapse of a given period. On the second surface 520 of the plastic lens 500, the recess 122 is not formed as with the present invention. Therefore, once the resin is injected into the cavity 600 from the gate 601, thereafter the flow of the resin cannot be controlled and the resin flows at different rates inside the cavity 600 and consequently, points where the flows merge cannot be prevented. As depicted in FIG. 14, flows tend to merge at areas where the distance between positions where the resin has flowed farthest narrows. These points result in weld lines, which cause optical defects.

In this manner, according to the present invention, when the plastic lens is formed, by forming the recess 122 around the concave aspect 121 of the second surface 120, the occurrence of weld lines, which cause optical defects, can be prevented. In particular, by forming a plastic lens that satisfies the conditional expressions above, at the time of forming the plastic lens, a balance between the strength of the flow of the resin flowing along the inner peripheral portion 202 of the cavity 200 and the strength of the flow of the resin flowing toward the central portion of the cavity 200 can be maintained where the flows are substantially uniform, and the speed of the resin flowing in the cavity 200 can be controlled to be uniform. As a result, the occurrence of points where flows merge in the cavity 200 are suppressed and the occurrence of weld lines, which cause optical defects, can be prevented. By comparing the present invention to the conventional technology described with reference to FIGS. 12A to 14, the advantages of the present invention become very clear.

As described, the plastic lens according to the present invention is applicable to an imaging apparatus of which high optical performance is demanded and is particularly suitable for an imaging apparatus of which high resolution is demanded.

According to the present invention, a plastic lens can be provided that has favorable optical characteristics and no weld lines that occur during formation of the lens and cause optical defects.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2010-269715 filed in Japan on Dec. 2, 2010.

What is claimed is:

1. A plastic lens comprising:
a first surface and a second surface that each have an optical function, wherein the second surface comprises:
an optically functional concave aspect,
a recess arranged along an outer perimeter of the concave aspect and formed around an optical axis,
a first protruding portion arranged at a boundary of the concave aspect and the recess around the optical axis,
a second protruding portion arranged at a boundary of the recess and the peripheral surface and formed around the optical axis, and
a gate portion formed on the peripheral surface, at a position where a resin injection outlet is arranged during formation of the plastic lens;
a peripheral surface formed at a periphery of the first surface and the second surface;
a central portion of a thickness that is thinner than that of a peripheral portion of the plastic lens;
a first inclined aspect between an apex of the recess and the first protruding portion; and
a second inclined aspect between an apex of the recess and the second protruding portion, wherein the plastic lens is formed by injection of resin, and
a conditional expression (1) θ1<θ2 is satisfied, where θ1 is an angle between a plane orthogonal to the optical axis of the plastic lens and the first inclined aspect, and θ2 is an angle between the plane orthogonal to the optical axis of the plastic lens and the second inclined aspect.

2. A plastic lens comprising:
a first surface and a second surface that each have an optical function;
a peripheral surface formed at a periphery of the first surface and the second surface; and
a central portion of a thickness that is thinner than that of a peripheral portion of the plastic lens, wherein
the second surface comprises:
an optically functional concave aspect,
a recess arranged along an outer perimeter of the concave aspect and formed around an optical axis,
a first protruding portion arranged at a boundary of the concave aspect and the recess around the optical axis,
a second protruding portion arranged at a boundary of the recess and the peripheral surface and formed around the optical axis, and
a gate portion formed on the peripheral surface, at a position where a resin injection outlet is arranged during formation of the plastic lens,
the plastic lens is formed by injection of resin, and
a conditional expression (2) i−f>0 is satisfied, where i is a height of a lower aspect of the gate portion with respect to a distal end of the second protruding portion, and f is a height of an apex of the recess with respect to a distal end of the second protruding portion.

3. A plastic lens comprising:
a first surface and a second surface that each have an optical function;
a peripheral surface formed at a periphery of the first surface and the second surface; and
a central portion of a thickness that is thinner than that of a peripheral portion of the plastic lens, wherein
the second surface comprises:
an optically functional concave aspect,
a recess arranged along an outer perimeter of the concave aspect and formed around an optical axis,
a first protruding portion arranged at a boundary of the concave aspect and the recess around the optical axis,
a second protruding portion arranged at a boundary of the recess and the peripheral surface and formed around the optical axis, and
a gate portion formed on the peripheral surface, at a position where a resin injection outlet is arranged during formation of the plastic lens,
the plastic lens is formed by injection of resin, and
at least one of conditional expressions (5) $0.4 \leq b/a \leq 0.65$ and (6) $0.4 \leq b/a1 \leq 0.65$ is satisfied, where a1 is an outer diameter of the plastic lens, a is a diameter of an effective optical aspect of the first surface, and b is a diameter of an effective optical aspect of the second surface.

4. The plastic lens according to claim 3, wherein a conditional expression (3) $1:3.5 \leq t:h \leq 1:2$ is satisfied, where t is the thickness of the central portion of the plastic lens, and h is the thickness of the peripheral portion of the plastic lens or a thickness from a peripheral edge of the optically functional concave aspect of the second surface (a distal end of the first protruding portion) to a peripheral portion of an optically functional aspect of the first surface.

5. The plastic lens according to claim 4, wherein a conditional expression (4) $0.2 \leq f/h \leq 0.6$ is satisfied, where f is a height of an apex of the recess with respect to a distal end of the second protruding portion.

6. The plastic lens according to claim 4 wherein a conditional expression (9) $-0.3 \leq g/h \leq 0.5$ is satisfied, where a direction from the first surface toward the second surface is positive, and g is a height of a distal end of the second protruding portion with respect to a position of the distal end of the first protruding portion.

7. The plastic lens according to claim 3, wherein a conditional expression (7) $0.75 \leq c/a1 \leq 1$ is satisfied, where c is an outer diameter of the second protruding portion.

8. The plastic lens according to claim 7, wherein a conditional expression (8) $0.75 \leq e/c \leq 0.9$ is satisfied, where e is an inner diameter of the second protruding portion.

9. The plastic lens according to claim 3, wherein a conditional expression (9) $-0.3 \leq g/h \leq 0.5$ is satisfied, where a direction from the first surface toward the second surface is positive, and g is a height of a distal end of the second protruding portion with respect to a position of the distal end of the first protruding portion.

10. The plastic lens according to claim 3, wherein the first surface is arranged on an object side or an image side.

* * * * *